(12) United States Patent
Keen

(10) Patent No.: US 7,251,563 B2
(45) Date of Patent: Jul. 31, 2007

(54) SYSTEM AND METHOD FOR COMPUTING INORGANIC PARTICLE SUSPENSIONS BY WAVE AND CURRENT ACTION

(75) Inventor: Timothy R. Keen, Slidell, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/229,430

(22) Filed: Sep. 16, 2005

(65) Prior Publication Data

US 2006/0109744 A1    May 25, 2006

Related U.S. Application Data

(60) Provisional application No. 60/610,867, filed on Sep. 16, 2004.

(51) Int. Cl.
*G06F 17/00* (2006.01)

(52) U.S. Cl. ............................................. 702/2; 703/9

(58) Field of Classification Search .................... 702/2, 702/3; 703/2, 9; 73/170.32
See application file for complete search history.

(56) References Cited

U.S. PATENT DOCUMENTS

2006/0109744 A1* 5/2006 Keen .......................... 367/131

OTHER PUBLICATIONS

Keen, T.R., Glenn, S.M., "Resuspension and Advection of Sediment During Hurricane Andrew on the Louisiana Continental Shelf", Proceedings of the Conference on Estuarine Coast Modeling V, American Society of Civil Engineers, pp. 481-494, 1998.
Keen, T.R., Stavn, R.H., "Developing a Capability to Forecast Coastal Ocean Optics: Minerogenic Scattering", Proceedings of the Conference on Estuarine Coast Modeling VI, American Society of Civil Engineers, pp. 178-193, 2000.
A. Morel, L. Prieur, "Analysis of Variations in Ocean Color", Limnology and Oceanography, vol. 22, pp. 709-722, 1977.
H. Bader, "The Hyperbolic Distribution of Particle Sizes", J. Geophysical Research, vol. 75, pp. 2822-2830, 1970.
Jerlov, N.G., Marine Optics, Elsevier Scientific Pub. Co., pp. 19-66, 175-194, 157-161, (1976).
S.M. Glenn, W.D. Grant, "A Suspended Sediment Stratification Correction for Combined Wave and Current Flows", J. Geophysical Research, vol. 92, 8244-8264, 1987.

(Continued)

*Primary Examiner*—Donald E McElheny, Jr.
(74) *Attorney, Agent, or Firm*—John J. Karasek; Sally A. Ferrett

(57) ABSTRACT

A method for estimating a suspended sediment distribution in an ocean region. The method includes receiving time-dependent variables including wave height, wave period, wave propagation direction, steady current magnitude, steady current direction, and water depth, and an estimate of bottom sediment distribution, calculating a new bottom sediment distribution using a sediment suspension and advection module, calculating a concentration of sediment by size at a plurality of depths using an ocean bottom boundary layer hydrodynamic module. A central module uses C++ language to transfer calculations from the sediment suspension and advection module and the ocean bottom boundary layer hydrodynamic module.

10 Claims, 4 Drawing Sheets

OTHER PUBLICATIONS

Sydor, M., "Uniqueness in remote sensing of the inherent optical properties of ocean water", Applied Optics, vol. 43, No. 10, Apr. 1, 2004, p. 2156-2162.

Maffione, R., "Instruments and methods for measuring the backward-scattering coefficient of ocean waters", Applied Optics, vol. 36, No. 24, Aug. 20, 1997, p. 6057-6067.

Sydor, M., "Effect of suspended particulate and dissolved organic matter on remote sensing of coastal and reverine waters", Applied Optics, vol. 36, No. 27, Sep. 20, 1997.

Harris Jr., F., "Calculated Mie Scattering Properties in the Visible and Infrared of Measured Los Angeles Aerosol Size Distributions", Applied Optics, vol. 11, Nov. 1972.

Gould, R., "Spectral dependence of the scattering coefficient in case 1 and case 2 waters", Applied Optics, vol. 38, No. 12, Apr. 20, 1999, p. 2377-2383.

Sydor, M., "Remote-sensing technique for determination of the volume absorption coefficient of turbid water", Applied Optic, vol. 37, No. 21, Jul. 20, 1998, p. 4944-4950.

Twardowski, M., "A model for estimating bulk refractive index from the optical backscattering ratio and the implications for understanding particle composition in case I and case ll waters", Journal of Geophysical Research, vol. 106, No. C7, p. 14, 129-14, 142, Jul. 15, 2001.

Behrenfeld, M., "Carbon-based ocean productivity and phytoplankton pshysiology from space", Global Biogeochemical Cycles, vol. 19, GB1006, doi:10.1029/2004GB002299, 2005.

Arnone, R., "The Evolution of Optical water Mass Classification" Oceanography, vol. 17, No. 2, Jun. 2004.

Schofield, O., "Watercolors in the Coastal Zone", Oceanography, Vol. 17, No. 2, Jun. 2004, p. 24-31.

Forand, J., "Particle distributions and index of refraction estimation for Canadian waters", SPIE vol. 3761, Jul. 1999, p. 34-44.

Keen, T.A., "A Coupled Hydrodynamic-Bottom Boundary Layer Model of Ekman Flow on Stratified Continental Shelves", Journal of Physical Oceanography, vol. 24, 1994, p. 1732-1749.

Junge, C., "Concentration and Size Distribution Measurements of Atmospheric Aerosols and a Test of the Theory of Self-Preserving Size Distributions", Journal of the Atmospheric Sciences, vol. 26, Nov. 12, 1968, p. 603-608.

Stavn, R., "Suspended minerogenic particle distributions in high-energy coastal environments: Optical implications", Journal of Geophysical Research, vol. 109, C05005, doi:10.1029/2003JC002098, 2004.

\* cited by examiner

```
Engine *ep = NULL;
char command[1024];

if ( (ep = engOpen(NULL) ) == NULL )
MessageBox("Can't start MATLAB engine");

sprintf(command, "cd('%s');". f_WORKINGDIR); //this tells the matlab engine where
to look
engEvalString(ep, command);
engEvalString(ep, "moviepics;");
} // end if(f_LSTOP % f_LPRINT == 0)

Update_GL_Window(&glWnd);                                             // refreshes
window for the next OpenGL plot
} // end for (timestep)

KillVideo( &glWnd );
DestroyGLWNDList();

return NULL;
}

LRESULT CStatusPage4::OnWizardNext()
{
return 0;
}
```

FIG. 2

```
#define FortranFunc extern "C" void_stdcall

FortranFunc get_mooring_data(float *, float *, int *, int *, float *, int *, int *, int
*, int *, float *, float *, float *, float *, float *,int *, int*, int *);

BOOL CMooringDlg::OnSetActive()
{
        CPropertySheet* pSheet = (CPropertySheet*)GetParent();
        ASSERT_KINDOF(CPropertySheet, pSheet);
        pSheet->SetWizardButtons(PSWIZB_BACK | PSWIZB_NEXT);
        if (m_first)
        {
                /* first time this page is activated */
                FILE *FileP = fopen("MOORING.IN", "r");

m_first = 0;

m_MooringList.SetColumnTypes(g_types, NUM_LOGCOLUMNS);
                m_MooringList.SetHighlightType(HIGHLIGHT_ROW);

m_MooringList.InsertColumn(0, "#", LVCFMT_RIGHT, 25);
                m_MooringList.InsertColumn(1, "Name", LVCFMT_LEFT, 70);
                m_MooringList.InsertColumn(2, "Latitude", LVCFMT_LEFT, 100);
                m_MooringList.InsertColumn(3, "Longitude", LVCFMT_LEFT, 100);
                m_MooringList.InsertColumn(4, "I", LVCFMT_LEFT, 55);
                m_MooringList.InsertColumn(5, "J", LVCFMT_LEFT, 55);
                m_MooringList.InsertColumn(6, "Depth", LVCFMT_LEFT, 90);
```

FROM FIG. 3A

```
if (FileP)
{
        char buf[256],
                *Name, *sLat, *sLon, *sI, *sJ, *s;
        float Lat, Lon;
        int i, j, count = -1;
        float depth;

CString strI, strJ, strDepth, strCount, strname;

fgets(buf, sizeof(buf),FileP); /* # of moorings */
        while (fgets(buf, sizeof(buf), FileP))

{
                count++;
                Name = strtok(buf, " ");
                sLon = strtok(NULL, " ");
                sLat = strtok(NULL, " ");
                sI = strtok(NULL, " ");
                sJ = strtok(NULL, " ");
        if (sI !=NULL) {//check to see there are values for points i, j if so
                        i = (int)atoi(sI);//passes them to get_mooring_data routine
                                j = (int)atoi(sJ);
                } for (s = Name + strlen(Name) - 1; *s == 'x'; s--);
                if (*(s + 1) == 'x') *(s + 1) = NULL;

if (!Name || !sLat || !sLon)
                        continue;

Lat = (float)atof(sLat);
                Lon = (float)atof(sLon);
get_mooring_data(&Lat,&Lon, &i, &j, &depth, &f_IMIN, &f_IMAX, &f_JMIN, &f_JMAX, &f_DX,
&f_DY, f_ALON, f_ALAT, f_DEPTH, &f_IUNIT, &f_IMO, &f_JMO); //fortran call
```

FIG. 3B

SYSTEM AND METHOD FOR COMPUTING INORGANIC PARTICLE SUSPENSIONS BY WAVE AND CURRENT ACTION

CROSS-REFERENCE TO RELATED APPLICATIONS

This application is a Non-Prov of Prov (35 USC 119(e)) application 60/610,867 filed on Sep. 16, 2004, incorporated by reference herein in its entirety.

BACKGROUND OF THE INVENTION

Optical type II water is significantly affected by inorganic mineral matter. The optical properties of type II water can change rapidly because surface waves, advection, and internal waves suspend the bottom sediments. Further, optical effects of mineral and organic particles differ because of differences in the volume scattering function. As a result, inverting radiances and irradiances to obtain optical properties and concentrations of materials such as suspended sediment and chlorophyll can be difficult.

Models that describe the optical properties of the open ocean based on biological materials such as chlorophyll have been discussed in Morel, A., and Prieur, L., "Analysis of variations in ocean color", Limnology and Oceanography, 22, p. 709-722 (1977). Some effects of inorganic materials on optical properties are discussed in Michael Sydor. Robert A. Arnone, "Effect of suspended particulate and dissolved organic matter on remote sensing of coastal and riverine waters", Applied Optics, Volume 36, Issue 27, p. 6905-6912, 1997.

Additional information about coastal ocean optical properties is found in O. Schofield, R. A. Arnone, W. P. Bissett, T. D. Tickey, C. O. Davis. Z. Finkel, M. Oliver, and M. A. Moline, "Watercolors in the Coastal Zone", Oceanography, Volume 17, No. 2. pages 24-31, and R. A. Arnone, A. M. Wood, and R. W. Gould, "The Evolution of Water Mass Classification", Oceanography, Volume 17, No. 2, pages 15-16.

BRIEF SUMMARY OF THE INVENTION

An embodiment of the invention is directed to a method for estimating a suspended sediment distribution in an ocean region. The method includes receiving time-dependent variables including wave height, wave period, wave propagation direction, steady current magnitude, steady current direction, and water depth, and an estimate of bottom sediment distribution, calculating a new bottom sediment distribution using a sediment suspension and advection module, calculating a concentration of sediment by size at a plurality of depths using an ocean bottom boundary layer hydrodynamic module. A central module uses C++ language to transfer calculations from the sediment suspension and advection module and the ocean bottom boundary layer hydrodynamic module.

BRIEF DESCRIPTION OF THE DRAWINGS

FIG. 2 is C++ code that is part of a computer program for implementing the system and method of FIG. 1.

FIG. 3 is C++ code that is part of a computer program for implementing the system and method of FIG. 1.

DETAILED DESCRIPTION OF THE INVENTION

Figure 1:
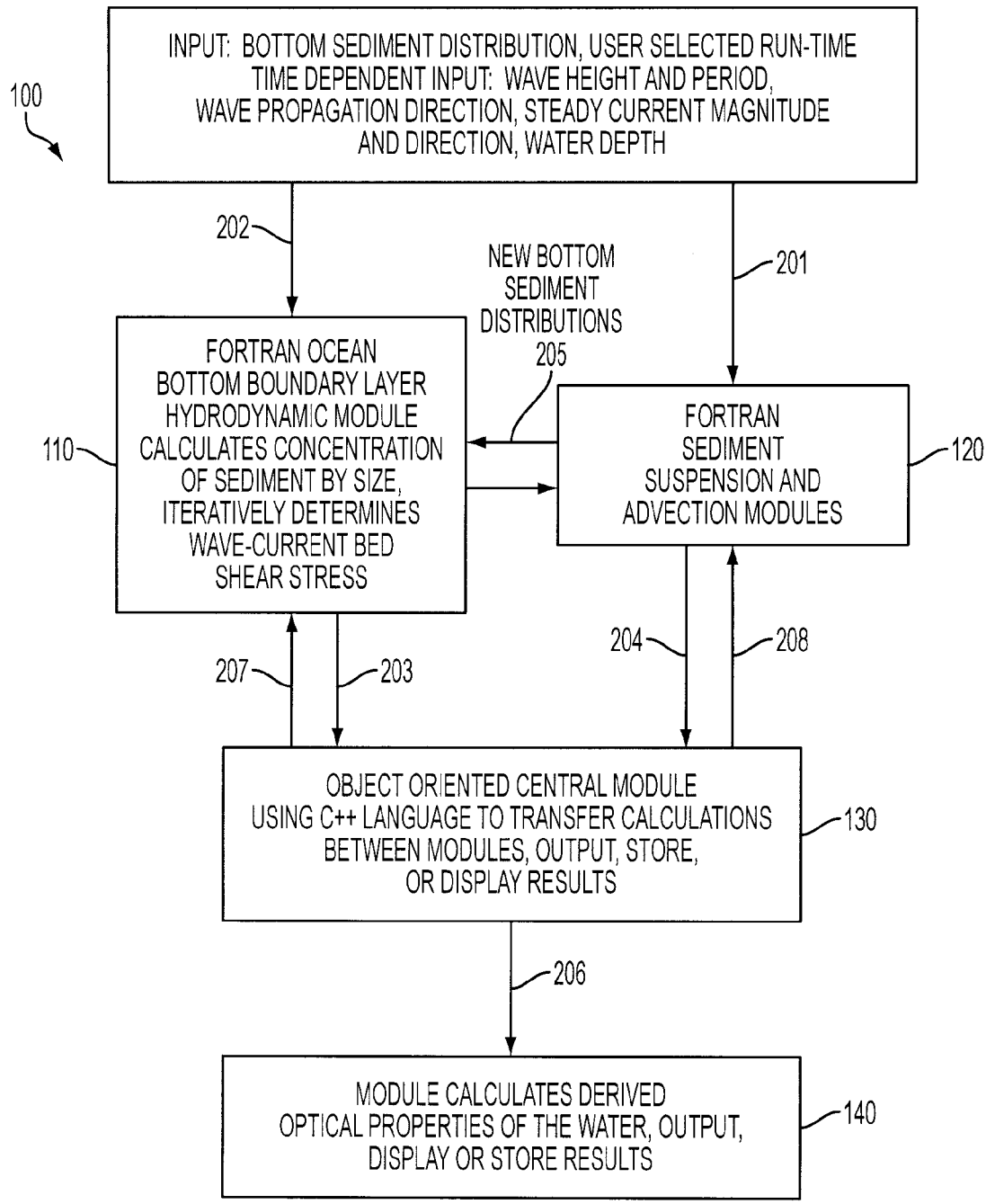
FIG. 1 is a schematic view of a system and method in accordance with an embodiment of the invention.

Embodiments of the invention are directed to systems and methods for simulating hydrodynamic and sedimentological environments and for predicting a three-dimensional concentration of suspended sediment in an ocean environment, and in particular, for predicting the inorganic particle distribution.

There are several ways to express particle distributions based on particle diameter, volume, and surface area. A particle size distribution can be expressed as particle concentration for a given particle diameter. A cumulative number distribution can be used effectively for particle size distributions, and is consistent with the particle size distribution provided by Coulter counters produced by Beckman Coulter. Inc that use an electrical sensing zone method. Other methods are discussed in Bader, H., "The hyperbolic distribution of particle sizes", Journal of Geophysical Research, 75, 2822-2830 (1970). Additional distributions are discussed in C. E. Junge, Comments on "Concentration and Size Distribution Measurements of Atmospheric Aerosols and a Test of the Theory of Self-Preserving Size Distributions". J. Atmos. Sci. 26 (3), pages 603-608 (1969).

The cumulative number distribution is expressed as $N = k D^{-c}$, where N is the concentration of particles If particles larger than the size of diameter D in units of particles per cubic meter, k is a constant related to the total particle distribution, and c is a coefficient indicating exponential decay of the particle concentration as the particle diameter increases.

FIG. 1 is a schematic view of a system and method for calculating inorganic particle distributions in shallow water.

The system 100 of FIG. 1 includes an ocean bottom boundary layer hydrodynamic model 110, a sediment suspension and advection model 120, and a central module 130.

Inputs to the system 100 include wave and current forcing information including time dependent inputs of wave height, wave period, wave propagation direction, steady current magnitude, steady current direction, water depth. The inputs are received 201 and 202 by the ocean boundary layer hydrodynamic module 110 and the sediment suspension advection module 120. This information can be received from nearby measurement stations. The bottom current speed and direction information can be from other models, acoustic doppler current profilers, or other sources. For example, acoustic doppler current profilers can provide data such as the following, measured at a location near the seabed, in this example, 1 meter above the seabed.

|  | day 1 | day 4 |
|---|---|---|
| ADCP current | 0.092 m/s | 0.082 m/s |
| significant wave height | 1.8 m | 1.35 m |
| peak wave period | 6 s | 9 s |
| wave orbital speed | 0.322 m/s | 0.41 m/s |
| wave orbital diameter | 0.312 m | 0.627 m |
| wave direction | 86 degrees | 89 degrees |

The input can also include bottom sediment distribution. In an exemplary embodiment, the sediment suspension module 120 recalculates values for the bottom sediment distribution, and provides 205 the calculated bottom sediment distribution to the ocean bottom boundary layer hydrodynamic module 130.

The sediment suspension model 120 computes sediment concentrations for a number of sizes of sand and silt, and in an exemplary embodiment, computes sediment concentrations for twenty size classes of sand and silt. The sediment suspension model uses logarithmic axis stretching for the vertical dimension.

The ocean bottom boundary layer hydrodynamic model 110 can be a model such as that described in Timothy R. Keen and Scott M. Glenn, "A Coupled Hydrodynamic-Bottom Boundary Layer Model of Ekman Flow on Stratified Continental Shelves", J. Phys. Oceanography, 24 (8), p. 1732-1749 (1994) or any other suitable ocean bottom model.

The ocean bottom boundary layer hydrodynamic model 110 also uses logarithmic axis stretching for the vertical dimension.

The central module 130 produces outputs that can be input 207 and 207 to the sediment module 120 and the hydrodynamic model 110, displayed, or input to other software packages, such as Microsoft Foundation class libraries, C++ functions, MATLAB, and OpenGL. The central module 130 uses is C++ based and uses OOP technology to integrate both OOP and procedural programming techniques, MFC interfaces. C++ classes, FORTRAN subroutines, and OpenGL interactive windows.

The modules 110, 120, and 130 use multithreading, allowing each function to be called on a different thread, thus distributing the CPU load. Variables passed between FORTRAN and C++ modules utilize a memory system, which also collects any garbage from class construction and destruction. Macros containing MATLAB functions are defined within C-H-classes and added to dialog boxes in the Graphical User Interface (GUI). The event-handling capabilities of MFC's allow fast access to the visualization libraries of MATLAB. An example of a MATLAB call and OpenGL call within a C++ object class is shown in FIG. 2.

The FORTRAN functions, which do the geophysical computations, are defined within C++ classes and within header files. Each FORTRAN function or subroutine is defined in the C++ classes as "Fortran Func"; this definition is classified as an extern C standard call. The FORTRAN function is then defined with the type of each variable. The FORTRAN subroutine call statement is placed within each class that calls the subroutine; the syntax does not change much for a FORTRAN-to-FORTRAN call. Variables are defined as pointers that hold unique memory locations. The memory allocation is handled by C++ coding, which imitates FORTRAN common blocks but does not present the problems of common blocks. Because the code simulates common blocks, there is greater compatibility with the FORTRAN code. This C++ code "common_vars.cpp" allocates the memory space to hold the binary representation of the defined variables. The length and content of every variable is written to a binary file. When the variable is needed, the C++ code reads in the length, content and previous memory address from a temporary directory; from this point, the C++ classes can retrieve the data needed to process the input coming from the user as well as transfer data to the FORTRAN code to compute results. All of the arrays used by the application are initialized to zero by "common_vars.cpp". The method of coding C++ functions within classes that mirror the FORTRAN subroutine calls was also applied to OpenGL functions, allowing easy access to graphics devices. With the functions included within the header files as well as the C++ class objects, data can be passed with ease between programming languages without converting formats. This type of header file usage brings the various technologies together into a uniform programming environment. This uniform environment presents the different programs (e.g., OpenGL, FORTRAN, C++, MATLAB) as one application, thus removing the barriers of formats and syntax. Because of the use of header files, the working code can be modified easily within the object-oriented classes in the C++ programming syntax. The cohesiveness of the application and the effectiveness of data transfer between commercial off-the-shelf (COTS) software create the sense of a module or a dynamically linked library. Furthermore, because of the similar syntax of OpenGL, MATLAB and C++, coding is relatively straightforward. The switching between and calls to the OpenGL windows and the passing of variables to and from MATLAB depend on a smooth transaction between the different COTS codes. Their similar syntax allows data to be passed from functions and classes as well as FORTRAN subroutines. This is largely due to the use of efficient memory allocation.

Key FORTRAN variables used for setup are defined in the "statuspage" header files in order for the C++ classes to utilize them during operation. Having key setup FORTRAN subroutines defined within the header files allows for quicker execution of the setup process, which would take up a considerable amount of time. For example, FIG. 3 shows an example of function definition and call within a class in an exemplary embodiment.

The memory allocation method bridges the gap between the C++ and FORTRAN by making the data accessible to both in a format their syntax will recognize. This is a concern because of the way C++ and FORTRAN handle floating pointers. In a typical mixed C++ and FORTRAN program, variables need to be defined in both programs. However, the FORTRAN REAL*8 corresponds to float in C. Therefore, in this application REAL is changed to float and is thus viewed the same way in all of the different syntaxes without access violation errors. The "common_var.cpp" code handles the data so well that there are no problems with memory leaks. Once the code is finished with an array, the pointer is freed or the variable is dumped into the binary file where it can be called and reallocated to a memory address if needed again.

In an exemplary embodiment, a user enters parameters for a run into a series of menus: e.g., project name, date, working directory, grid directory, and run mode. Environmental variables are input and checked by the user. Once selected, the windows registry saves the input paths in memory so that the next time the application is run these directories would be the defaults. These directories contain input data files as well as key objects, which keep the system aware of any saved parameters. A series of options, questions, data fields and button clicks guide the user through the setup procedure. Visual plots may be produced by the MATLAB engine during setup. When a raw data matrix is displayed, a button click causes the application to activate an engine, which loads a scripted file that in turn generates a color contour plot. This option is available throughout the setup step. At the end of the setup procedure, the data that is generated can also be viewed in a color contour plot. The application also reloads the previous data matrices in order to generate images for mpeg movies. After the initial input fields are selected, the options for reloading the saved binary values and initial parameters are chosen. When the boxes are checked, the initial values are entered and the saved values are reloaded back into memory addresses. When this option is selected, the application automatically goes to the end of the setup process to reproduce the results of the previous run. This binary file can be stored and catalogued for future reference. Key data is used to generate OpenGL graphics, which add interactive qualities to the application.

The BBLM and SSM modules 110 and 120 are coupled with feedback between them. Computations within the BBLM and SSM modules 110 and 120 are completed on a regular Cartesian grid whose cells represent area averages of the ocean floor. Within each cell, the BBLM and SSM modules 120 and 130 compute the seafloor properties and suspended sediment distributions. In an exemplary embodiment, time stepping is used to make computations for the run interval selected by the user. At each time step, new input fields for environmental variables including wave height, wave period, wave propagation direction, steady current magnitude and direction are read from files using the paths input by the user during setup. At each time step, the application calculates the bottom properties and sediment distributions within each cell.

The wave-current bed shear stress is determined iteratively. An initial guess for the ratio of the steady current to the oscillatory current within the wave boundary layer is calculated by assuming there is no sediment in suspension (unstratified boundary layer). This solution is then substituted into the equations for the wave-current boundary layer when sediment is in suspension (stratified boundary layer). The solution is similar to that for the unstratified boundary layer except for the effect of suspended sediment on near-bed turbulence. This effect is introduced through a stability parameter (mixing length), which dampens turbulence and thus reduces sediment mixing above the wave boundary layer.

After the wave friction factor is found as in the unstratified boundary layer, the reference concentration just above the bed $C_{0n}$ is calculated for each size class. Con is dependent on the bed concentration $C_{bn}$, which is computed initially from the grain size distribution in the bed. If the shear stress is sufficient to entrain class n there will be a loss of sediment from the bed. This loss is represented by $H_R$.

Bed armoring, a physical phenomenon that can result as finer material is preferentially removed, is incorporated in the model by using an active layer $h_A$, which represents that part of the bed that interacts with the flow during one time step. This active layer relates the sediment profile to the physical bottom parameters used to calculate the wave-current shear stress. The active layer during low flow conditions exceeding the initiation of motion criteria are expected to be proportional to ripple height. During high flow conditions, the active layer is proportional to the height of the near-bed transport layer. The active layer height $h_A$ is calculated $h_A = \eta + H_{TM}$, where $H_{TM}$ is the height of the near transport layer and $\eta$ is the ripple height.

If $H_R$ exceeds $h_A$, then $C_{bn}$ is reduced by the ratio, $h_A/H_R$, to simulate armoring and a new reference concentration is found. New profiles of currents, sediment concentrations, and the stability parameter are then calculated at the grid point. This reduction procedure is repeated until the resuspension depth of the size class does not exceed $h_A$. When the newly computed ratio of the steady current to the oscillatory current matches the given value from environmental variables, the solution has converged.

After the suspended sediment, stability parameter, and current profiles have been computed at each grid point, a bed conservation equation is solved for each size class. The size-fractionated mass fluxes are integrated over the bottom boundary layer to form the advection terms for the mass-conservation equation. Mass gains or losses for each sediment size class at a grid point are used to compute changes in bed elevation. An increase in elevation is deposition and a decrease in elevation is erosion. If the erosion depth due to a size class exceeds $h_A$, the reference concentration for that size class is reduced in the same way as for resuspension. Using the new reference concentration, the current profiles, size-fractionated sediment profiles, and stability parameter profiles are recomputed for the entire grid. This iterative procedure is applied at each grid point for each sediment size class in suspension. Because of this numerical procedure, the thickness of erosion or deposition for each size class at each grid point is found at the new time step. Thus, changes in bed elevation, bottom roughness, and the sediment distribution at each grid point are known at the new time.

The results from the modules 110 and 120 are input 203 and 204 to the central module 130, which processes the new values, and generates a series of images for immediate viewing and for compilation into a time sequence of images for post-run analysis.

The system 100 produces a three-dimensional size-fractionated suspended sediment distribution for a user selected region and grid resolution. The sediment distribution can further be input 206 to a module 140 for calculations of optical properties of the water. The system can also display a color contour map of derived optical properties.

An advantage of system 100 described herein is that the C++ central module 130 links disparate software. The system thus is rapid, responsive to action events, relatively compact, and efficient in utilizing CPU time and memory, allowing other applications to be run at the same time. In addition, MFC libraries makes the system user friendly with menus for the model setup procedure. The incorporation of OpenGL and MATLAB libraries allows the user to produce run-time images, movies and quantitative logs. The flexibility of the central module 130 gives it wide access to data whether from networks (through the use of COM+ objects) or data-gathering units.

Other embodiments of the invention are directed to methods and systems for receiving the attenuation coefficients and visibility results of the system 100, and for displaying or retransmitting the results in their original or modified format.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention.

Other embodiments of the invention include methods of receiving, displaying, further processing, making available for download, and/or transmitting the results generated by the system 100 and the methods discussed herein. Other embodiments of the invention include computer systems and computer readable media having programs or applications for receiving, displaying, further processing, and transmitting the results or information derived from the results, as well as for making the results available for retrieval by other users. The results can be in tabular, graphical, time series, or other formats.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A method for estimating concentrations of suspended sediment at a plurality of depths for at least one ocean location, the method comprising:
   receiving time-dependent inputs including wave height, wave period, wave propagation direction, steady current magnitude, steady current direction, and water depth for an ocean location;
   receiving an estimate of bottom sediment distribution for the ocean location;
   calculating a new bottom sediment distribution using a sediment suspension and advection module;
   calculating a concentration of sediment by size at a plurality of depths at the ocean location using an ocean bottom boundary layer hydrodynamic module;
   transferring calculations from the sediment suspension and advection module and the ocean bottom boundary layer hydrodynamic module to a C++ based central module; and
   outputting the concentration of sediment by size at a plurality of depths at the ocean location to another computer module, displaying the concentration of sediment by size at a plurality of depths at the ocean location, or storing the concentration of sediment by size at a plurality of depths at the ocean location for further retrieval.

2. The method of claim 1, wherein the sediment suspension and advection module provides the calculated bottom sediment distribution to the ocean bottom boundary layer hydrodynamic module.

3. The method of claim 1, the ocean bottom boundary layer hydrodynamic module iteratively determines values for wave-current bed shear stress.

4. The method of claim 1, further comprising:
   transferring the concentration of sediment by size at a plurality of depths to a module for calculating derived optical properties of the water.

5. The method of claim 1, further comprising:
   receiving a user-selected run time;
   wherein said calculating a concentration of sediment by size at a plurality of depths using an ocean bottom boundary layer hydrodynamic module is accomplished over the run time and for a plurality of ocean locations.

6. The method of claim 1, wherein said concentration of sediment by size at a plurality of depths is displayed in at least one of tabular, graphical, and time series format.

7. The method of claim 1, wherein the ocean bottom boundary layer hydrodynamic module and the sediment suspension and advection module are FORTRAN computer language based modules.

8. Computer readable media having a program for operating the method of claim 1.

9. A method for estimating concentrations of suspended sediment at a plurality of depths for at least one ocean location, the method comprising:
   receiving time-dependent inputs including wave height, wave period, wave propagation direction, steady current magnitude, steady current direction, and water depth for an ocean location;
   receiving an estimate of bottom sediment distribution for the ocean location;
   calculating a new bottom sediment distribution using a sediment suspension and advection module;
   calculating a concentration of sediment by size at a plurality of depths at the ocean location using an ocean bottom boundary layer hydrodynamic module;
   transferring calculations from the sediment suspension and advection module and the ocean bottom boundary layer hydrodynamic module to a C++based central module; and
   displaying the concentration of sediment by size at a plurality of depths at the ocean location.

10. A method for estimating concentrations of suspended sediment at a plurality of depths for at least one ocean location, the method comprising:
    receiving time-dependent inputs including wave height, wave period, wave propagation direction, steady current magnitude, steady current direction, and water depth for an ocean location;
    receiving an estimate of bottom sediment distribution for the ocean location;
    calculating a new bottom sediment distribution using a sediment suspension and advection module;
    calculating a concentration of sediment by size at a plurality of depths at the ocean location using an ocean bottom boundary layer hydrodynamic module;
    transferring calculations from the sediment suspension and advection module and the ocean bottom boundary layer hydrodynamic module to a C++based central module; and
    storing the concentration of sediment by size at a plurality of depths at the ocean location for further retrieval.

* * * * *